United States Patent
Ullrich et al.

(10) Patent No.: US 6,243,465 B1
(45) Date of Patent: *Jun. 5, 2001

(54) METHOD OF PROVIDING VIDEO PROGRAMMING NEARLY ON DEMAND

(75) Inventors: Kathryn E. Ullrich, Los Angeles, CA (US); Stephen S. Walker, Marlborough, MA (US); Lauren F. Calaby, Huntington Beach, CA (US); David E. Seibel, Colleyville, TX (US); Thomas F. Gillette, Boulder, CO (US)

(73) Assignees: GTE Service Corporation, Irving, TX (US); GTE Laboratories Incorporated, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/755,093

(22) Filed: Nov. 22, 1996

Related U.S. Application Data (63) Continuation of application No. 08/270,105, filed on Jul. 1, 1994, now Pat. No. 5,583,937, which is a continuation of application No. 07/633,637, filed on Dec. 21, 1990, now abandoned.

(51) Int. Cl.$^7$ ........................................................ H04N 7/167
(52) U.S. Cl. .................................. 380/20; 380/10; 380/16
(58) Field of Search ................................. 380/10, 20, 5, 380/16

(56) References Cited

U.S. PATENT DOCUMENTS

| | | |
|---|---|---|
| Re. 33,808 | 1/1992 | Wright, Jr. . |
| 2,570,475 | 10/1951 | Oestreicher et al. . |
| 3,639,686 | 2/1972 | Walker et al. . |
| 3,641,265 | 2/1972 | Ganske . |

(List continued on next page.)

OTHER PUBLICATIONS

"Home Video" by Hanna Rubin, *ADWEEK Western Advertising News*, vol. 39, Issue 37, Sep. 11, 1989, pp. 166–167.

"Moving Up the Time Table on DBS: SkyPix Plans Eighty Channel Pay–Per–View System in Less Than a Year" by Peter D. Lambert et al., *Broadcasting*, vol. 119, Issue 8, Aug. 20, 1990, pp. 27–28.

"SkyPix to Test American Public's Appetite for Pay–Per–View Movies," *Video Marketing Newsletter*, vol. 11, No. 17, Sep. 3, 1990.

"Futurists Probe for Answer: Is True Video–On–Demand the Vaporware of the '90s," *Video Technology Newsletter*, vol. 3, No. 3, Feb. 5, 1990.

"Update on the Cerritos Project" by Linda Haugsted, *Multichannel News*, Apr. 16, 1990.

(List continued on next page.)

*Primary Examiner*—David Cain
(74) *Attorney, Agent, or Firm*—Leonard Charles Suchyta (57) ABSTRACT

A method for providing video programming in a nearly on demand basis is disclosed. A video network includes a video server that operates several video recorders to simultaneously exhibit video performances or programs on a plurality of channels. The video server is controlled in real time in accordance with data presented to it in an exhibition plan. The exhibition plan calls for two or more channels to show the same program on a time offset basis. Due to the offset in exhibiting a given program, a subscriber may view a program at any time, from the beginning of a program, by waiting for a period of time that is no longer than the offset. Preferably, this offset is substantially shorter than the run time of the program. The channels carrying this program are unscrambled prior to the beginning of the program and for a predetermined duration into the program so that subscribers may preview the program. However, the channels are scrambled for the remainder of the exhibition of the program. A subscriber may order the program when it begins and for a short duration after the program becomes scrambled.

20 Claims, 3 Drawing Sheets

U.S. PATENT DOCUMENTS

| | | |
|---|---|---|
| 3,696,297 | 10/1972 | Otero . |
| 3,730,980 | 5/1973 | Kirk, Jr. . |
| 3,757,225 | 9/1973 | Ulicki . |
| 3,789,131 | 1/1974 | Harney . |
| 3,882,392 | 5/1975 | Harney . |
| 3,896,262 | 7/1975 | Hudspeth et al. . |
| 3,899,633 | 8/1975 | Sorenson et al. . |
| 3,911,204 | 10/1975 | Spinelli . |
| 4,190,800 | 2/1980 | Kelly, Jr. et al. . |
| 4,253,114 | 2/1981 | Tang et al. . |
| 4,331,974 | 5/1982 | Cogswell et al. . |
| 4,367,557 | 1/1983 | Stern et al. . |
| 4,381,522 | 4/1983 | Lambert . |
| 4,404,589 | 9/1983 | Wright, Jr. . |
| 4,455,570 | 6/1984 | Saeki et al. . |
| 4,506,387 | 3/1985 | Walter . |
| 4,538,174 | 8/1985 | Gargini et al. . |
| 4,700,386 | 10/1987 | Kohn . |
| 4,724,491 | 2/1988 | Lambert . |
| 4,792,972 | 12/1988 | Cook, Jr. . |
| 4,833,710 | 5/1989 | Hirashima . |
| 4,885,775 | 12/1989 | Lucas . |
| 4,890,320 | 12/1989 | Monslow et al. . |
| 4,891,633 | 1/1990 | Imazeki et al. . |
| 4,891,694 | 1/1990 | Way . |
| 4,914,694 | 4/1990 | Leonard et al. . |
| 4,941,040 | 7/1990 | Pocock et al. . |
| 4,947,244 | 8/1990 | Fenwick . |
| 4,949,170 | 8/1990 | Yanagidaira et al. . |
| 4,949,187 | 8/1990 | Cohen . |
| 4,995,078 | 2/1991 | Monslow et al. . |
| 5,003,384 | 3/1991 | Durden et al. . |
| 5,014,125 | 5/1991 | Pocock et al. . |
| 5,018,021 | 5/1991 | Slater . |
| 5,027,400 | 6/1991 | Baji et al. . |
| 5,132,789 | 7/1992 | Ammon et al. . |
| 5,155,591 | 10/1992 | Wachob . |

OTHER PUBLICATIONS

Communications Satellite Corp.—Company Report, by J.D. Gross, Donaldson, Lufkin & Jenrette Securities, Report No. 1035242, Oct. 9, 1990.

"Is There a Three–Horse Race in Cable's Future?" by Dennis H. Leibowitz, *Multichannel News,* p. 97, Nov. 26, 1990.

GTE Corp.—Company Report by M.G. Bye et al., Shearson Lehman Brothers, Inc., Report No. 942674, Dec. 7, 1989, p. 11.

"Biondi Describes Shape of Media to Come" by Frank Biondi, Jr., *Broadcasting Journal,* vol. 118, Issue 22, May 28, 1990.

William M. Bulkeley, "GTE Test Offers View of Video Future," *The Wall Street Journal,* Dec. 29, 1988, at B1.

Patent Cooperation Treaty ("PCT") International Application No. PCT/US90/00684 entitled "System for Teledistribution of Unscheduled Program Signals"; Steven D. Kravitz, applicant and inventor; International Publication Date: Aug. 23, 1990 ("Kravitz publication").

METHOD OF PROVIDING VIDEO PROGRAMMING NEARLY ON DEMAND

This is a continuation of U.S. patent application Ser. No. 08/270,105, filed Jul. 1,1994, now U.S. Pat. No. 5,583,937, which is in turn a continuation of U.S. patent application Ser. No. 07/633,637, filed Dec. 21,1990, now abandoned.

RELATED PATENTS

The present invention is related to:
U.S. Pat. No. 5,311,423, entitled "Schedule Management Method" by P. Deborah Clark, assigned to GTE Service Corporation.
U.S. Pat. No. 5,383,112, entitled "Inventory Management Method" by P. Deborah Clark, assigned to GTE Service Corporation.
U.S. Pat. No. 5,163,353, entitled "Video Distribution System Allowing Viewer Access to Time-Staggered Identical Pre-recorded Programs" by Stephen S. Walker et al., assigned to GTE Laboratories Incorporated.

TECHNICAL FIELD OF THE INVENTION

The present invention relates generally to methods for providing video programming to a multiplicity of network subscribers. Specifically, the present invention relates to methods for operating a video network which supplies pay-per-view video programming to subscribers in a nearly on demand basis.

BACKGROUND OF THE INVENTION

Video and audio broadcasters engage in performing or otherwise broadcasting audio and visual productions or programs. Typically, such performances are provided to the broadcasters on magnetic and optical recording media, such as video and audio disks and tapes, over satellite or network feeds, from live performances, and the like. The broadcasters rebroadcast these performances over their networks. Each broadcast may be considered an exhibition of the performance.

Various examples of networks, such as cable TV networks, operated by broadcasters are known to those skilled in the art. Such networks provide occasional programming on a pay-per-view (PPV) basis. Broadcasters would like to increase the quantity of pay-per-view programming because such programming may help them reduce the risks associated with licensing certain high-priced performances for exhibition. Increased pay-per-view programming would also provide a more fair basis for charging subscribers for the programming services that are delivered to their premises. In other words, subscribers would be able to pay a fair price for only that programming that they actually view rather than pay averaged prices for a variety of programming, such of which they do not actually view.

One impediment to providing more extensive PPV programming has been the cumbersome techniques used in ordering the PPV services. Another impediment to providing more extensive PPV programming has been the lack of an ability to have programming available when a subscriber wishes to view it. It is common knowledge that viewers prefer to make programming selections on impulse. In other words, viewers tend not to think ahead about the programming that they may want to view at a later time. They prefer not to commit themselves to viewing a particular program at a particular future interval in time but rather to decide on impulse that they want to view some sort of programming at the present time.

SUMMARY OF THE INVENTION

Accordingly, it is an advantage of the present invention that an improved method for providing pay-per-view (PPV) programming to subscribers of a network is provided.

Another advantage of the present invention is that the present invention provides a method for delivering programs to subscribers nearly in an on demand or impulse basis.

Yet another advantage is that the present invention provides a method for controlling scrambling and unscrambling of programming so that subscribers may view intelligible preview and promotional programming but not substantial portions of PPV programming until paying for it.

The above and other advantages of the present invention are carried out in one form by a method of providing video programs to subscribers via a transmission system that has the capacity for transmitting a plurality of video channels. The method calls for storing the video programs in a controllable video player system. The video player system is controlled in accordance with a predetermined schedule and in a manner that causes the video programs to be applied at specified times to specified channels of the transmission system. The schedule instructs the video player system to be controlled so that at least one selected video program is simultaneously applied to a plurality of channels. The respective starting times of the selected video program on the respective plurality of channels are staggered by time intervals of a relatively short period in relation to the run-time of the selected video program. The video program on the selected channels is processed in a manner that renders the program on the channels substantially unintelligible. The selected channels are broadcast to subscribers via the transmission system. When subscribers request to view the video program, the request is processed. In response to a request from a subscriber, the video program is rendered substantially intelligible to the subscriber on an appropriate one of the plurality of channels to which the selected video program is simultaneously applied.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED ENBODIMENT

Figure 1:
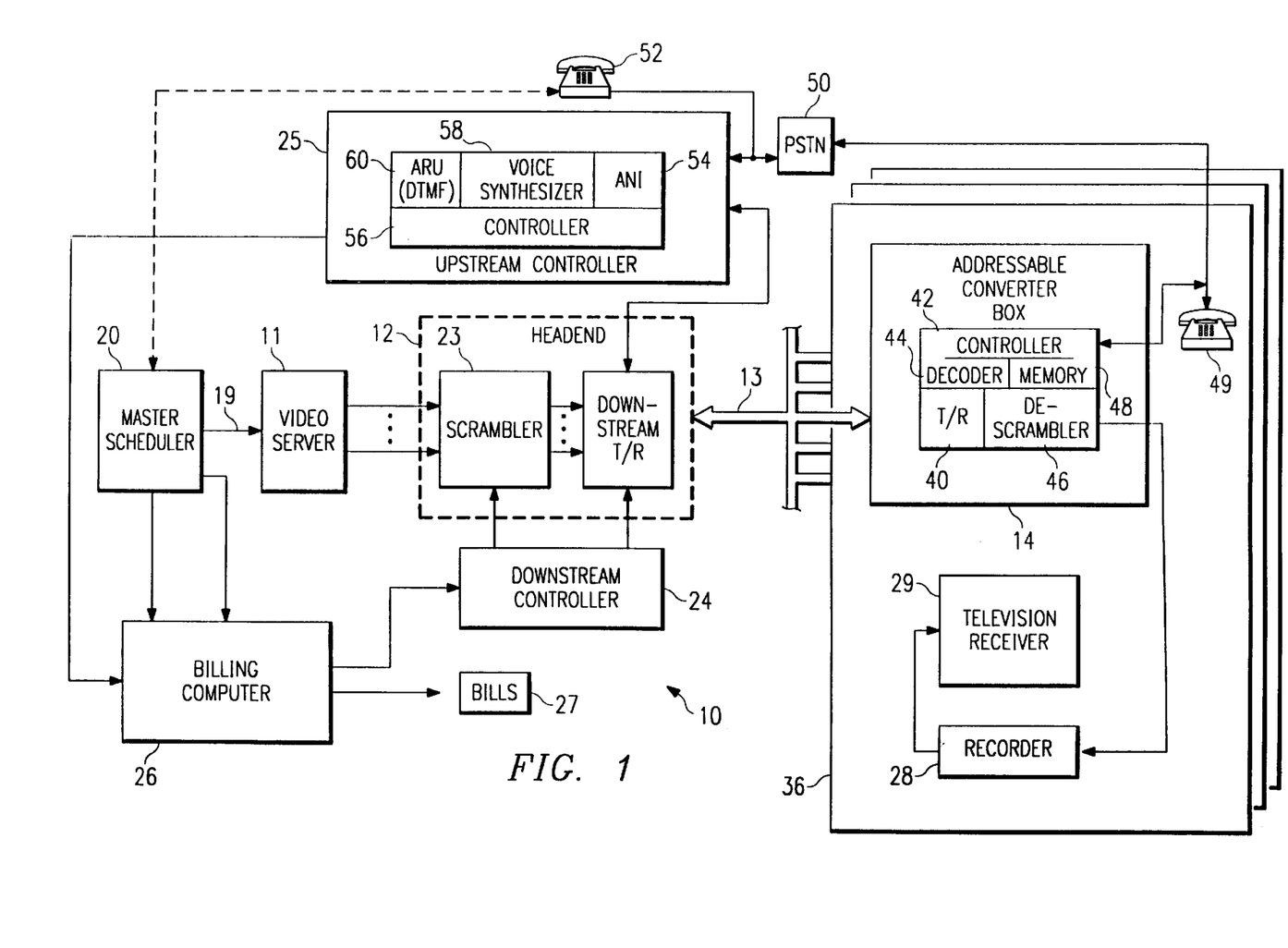
FIG. 1 shows a schematic representation of a system for distributing video programming, including a video server, in accordance with a preferred embodiment of the present invention.

Referring first to FIG. 1, there is seen a schematic representation of a system 10 for distributing video programming in accordance with a preferred embodiment of the present invention. System 10 includes a video server 11 interfaced to a headend 12 of a wideband transmission system 13 having a plurality of channels. Transmission system 13 couples to a multiplicity of addressable converter boxes 14 located in respective subscriber premises 36.

Figure 2:
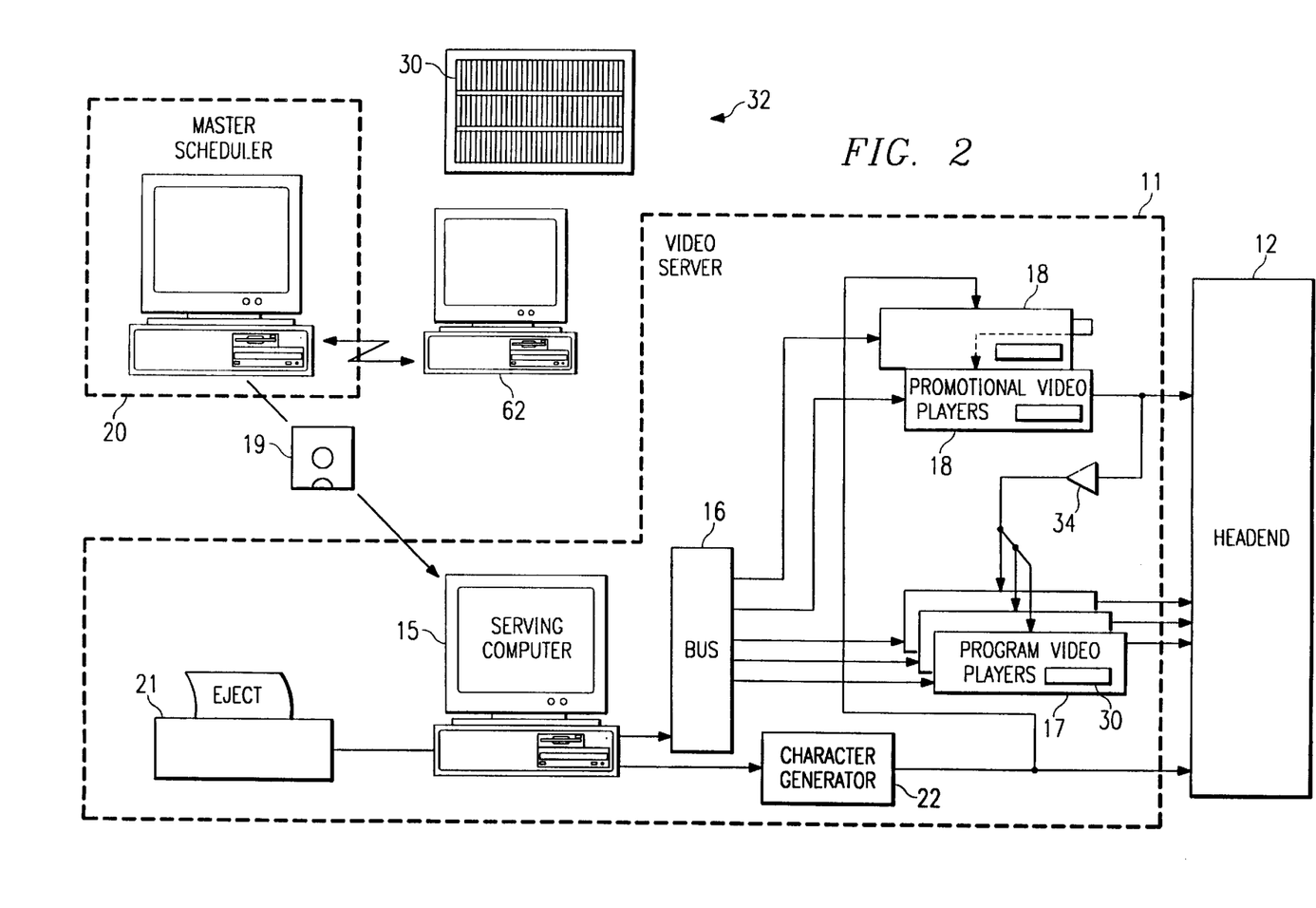
FIG. 2 shows a block diagram of a video server configured in accordance with the preferred embodiment of the present invention.

FIG. 2 is a block diagram of the video server 11 shown in FIG. 1. Video server 11 includes, among other elements, a serving computer 15 and software, a control bus 16, and a plurality of video players 17.

The serving computer 15 performs all control functions (e.g. start, stop, rewind, etc.) for the video players 17 in response to an exhibition plan or schedule (discussed below). Computer 15 also gathers video player usage data. The serving computer 15 is loaded with the exhibition plan, which specifies timing instructions. The serving computer 15 is programmed to provide real time outputs in response to these timing instructions. The exhibition plan may be provided to the serving computer 15 on magnetic memory 19 or transferred directly from a master scheduling computer 20. The exhibition plan includes a five-digit event code, a title, rating code, channel, starting times, dates, run time, and price for each exhibition of a performance.

The serving computer 15 also monitors the status of the video players 17 and operates promotional channel video players 18. Operations are controlled through a menu. A printer 21 prints a hardcopy listing the program to be placed in each video player 17. An operator display provides video player status monitoring. A status screen indicates whether a video playback machine is playing, rewinding, waiting to start playing, not in use, setting-up, or has failed. Provision of an alarm during video player failure is included. Monitors (not shown) show what is on a selected channel.

A commercially available parallel bus 16 provides a communications path between an output port of serving computer 15 and video players 17 and 18, allowing the serving computer 15 to automatically operate the control features of the video players. Bus 16 includes one or more bus controller panels which provide control signals in response to the real time outputs of the computer 15. These in turn operate video player parallel decoders, each of which can control several video players.

Video players 17 are used for playing recorded media containing programs in television format or for coupling a line feed from a live program. The video players 17 may be any controllable player means such as video cassette recorders (VCRs) or disk players. Pre-recorded video cassette format is the most abundant medium for video storage in the preferred embodiment of the present invention. Video cassette players may be software controlled for automatic rewind and playback of tapes. Optical disks are another storage medium. An attractive feature of optical disk players is the capability of multiple playing heads reading a disk.

Each video player has a control port coupled to the bus 16 and is responsive to the control signals. Each video player also has an output providing television signals for coupling to a separate corresponding channel via the headend 12 of the transmission system 13 (see FIG. 1).

The video players 17 play video selections starting at times specified by the exhibition plan. Each player can be set for different start times. At the start time, the medium is played from the start of the active program. At the end of the program the medium is automatically rewound, if necessary, and set to the program start.

In the preferred embodiment of the present invention, at least two of the video players 17 are loaded with duplicate recorded media and controlled to play at staggered or overlapping time intervals. This staggered timing of a single program on multiple channels allows subscribers to have access to desired video nearly on demand, as discussed below in connection with FIGS. 3–4.

The medium is changed in the video server in either of two circumstances. The first is when the exhibition plan dictates that a different program will start at a certain time and on a certain channel and the existing video medium should be removed and a new medium inserted. Accordingly, an operator say replace a given tape 30 to a library 32 and select a different tape 30 from library 32 for insertion in players 17–18 in accordance with scheduling instructions.

The second circumstance occurs if the medium degrades with usage and has been played a specified number of times. It is then replaced with a fresh copy. In the preferred embodiment, master scheduler 20 processes a given schedule to determine when a program has been played a predetermined number of times. The predetermined number is selected so that the chances of program degradation and mechanical tape problems are extremely small when the number of playings are kept below the predetermined number. This information is passed to video server computer 15. When this predetermined number of playings is achieved, a message is printed that instructs a user to replace a particular tape. In addition, by processing the schedule, master scheduler 20 anticipates when new media is needed to replace old media. Scheduler 20 prints appropriate reports which inform a user of when to acquire new recording media and of the quantities to acquire.

During a pause, such as rewinding, the input from another source cuts through the video player and becomes the player output which is shown on the channel. This enables the viewer's channel to show another video source such as a promotional or text channel during times when the player is not showing a program. Arrangements for a promotional channel are described below.

The video players 17 have stereo audio capacity. Since it is desirable to operate audio through balanced pairs for common mode rejection, two audio outputs are connected to a pair of unbalance-to-balance buffer amplifiers. Each video player's output signal is coupled to a corresponding channel at headend 12.

Each video player 17 output is coupled to its own corresponding channel on the transmission system. The video output of the video server is connected through scrambling means in headend 12. Each signal is delectably scrambled at headend 12 before being placed on transmission system 13 (see FIG. 1).

Video server 11 provides a promotional channel. The promotional channel operates similarly to a program channel, except each promotional segment is shorter in length than a program and is played continuously on one of two promotional video players 18. The two players alternately play identical preview segments. As one is playing, the other is rewinding. The promotional channel appears to play continuously. The switch from one video player to the other is set at a regular interval which does not interfere with controller operations of the other channels.

The promotional channel continuously shows promotional programming such as program previews, event promotions, order instructions, and programming information. A short promotional segment may be repeated back-to-back on a recorded medium so that the medium does not have to be rewound as frequently, thereby reducing medium wear. Information on the promotional channel is changed as required, e.g. monthly, according to the programming schedule. The promotional channel operations are software controlled by the serving computer 15.

A character generator 22 is coupled to the serving computer 15 for providing a menu in television format representing a programming schedule. The menu includes the specific times at which the beginnings of the video programs may be viewed and, if necessary, the channels upon which the video programs may be viewed. Server computer 15 continuously synchronizes the menu information with the operation of program video players 17. The output of the character generator 22 is coupled unscrambled through headend 12 to a channel designated for text.

The output of the character generator 22 is also connected to the input of the first promotional video player. The output of the first promotional video player is connected to the input of the second promotional video player. The output of the second promotional video player is connected to a channel designated for promotionals. If both promotional video players 18 are in a non-play condition, then the character generator 22 output is automatically connected to the promotional channel.

The promotional channel output signal also couples through a distribution amplifier 34 so that it may be fed to the plurality of program video players 17. When any channel is not supplied with video from its video player 17, the promotional channel is automatically exhibited. Accordingly, when a video player 17 is being rewound, the promotional channel's programming is automatically broadcast over the channel assigned to the video player 17.

With reference back to FIG. 1, the programs and promotions are distributed on an assortment of different channels of the transmission system 13. Transmission system 13 may be configured as broadcast, satellite, cable, or fiber. Headend 12, includes a scrambler 23, which delectably scrambles the channels. FIG. 1 shows all channels from video server 11 being routed through scrambler 23 for completeness. However, in the preferred embodiment, only program channels are actually scrambled. Moreover, the scrambling is switched off and on through control signals provided by a downstream controller 24. Controller 24 receives scheduling information from master scheduler 20 and controls scrambling in real time in accordance with the scheduling information. While FIG. 1 shows controller 24 as being a separate component from serving computer 15 of video server 11 (see FIG. 2), those skilled in the art will understand that serving computer 15 may be adapted to additionally operate as downstream controller 24.

Addressable converter box 14, or simply converter 14, enables downstream access to a channel. In other words, converter 14 allows and controls the viewing of programming in its respective subscriber premises 36. Addressable converter box 14 represents conventional equipment, which is known to those skilled in the art. Generally speaking, a preview or promotional period of programming is shown unscrambled prior to the showing of each program. Converter 14 passes this promotional material toward a television receiver 29 without any attempt at unscrambling. Thus, the subscriber may view intelligible programming. This unscrambled transmission continues for a predetermined period of time, preferably past the beginning of the program. However, downstream controller 24 eventually scrambles the program and instructs all enabled converters 14 in a global transmission to all premises 36 to begin unscrambling the program. For converters 14 which have been enabled, subscribers may continue to view intelligible programming. However, converters 14 which have not been enabled do not unscramble the received signals and therefore send only unintelligible programming, if any, toward television receiver 29.

Converter 14 includes a receiver or transmitter/receiver section 40 which converts the received signals to baseband. A controller 42 portion of converter 14 includes a decoder 44 which looks for data in the baseband signals that are addressed to the converter 14. Controller 42 also controls a descrambler 46 so that incoming signals are selectably unscrambled. Such data may be addressed globally, so that all converters 14 interpret data as being directed toward them, or locally, so that only a specific single converter 14 interprets the corresponding data as being directed toward it. When such data is detected, controller 42 examines the data to determine whether it represents credit data, instructions for unscrambling an incoming scrambled signal on a specified channel or channels, instructions for refraining from unscrambling an incoming unscrambled signal on a specified channel or channels, instructions for enabling a specific channel or channels so it or they may later be unscrambled, and the like.

The preferred ordering system is impulse pay-per-view. In other words, a subscriber may view a preview or beginning of a program and instantly, on impulse, order the program for viewing at his or her premises 36. The ordering process allows ordering from a choice of different programs which start at various times. The preferred ordering process is capable of processing orders, both requesting and canceling service, in advance or up until some time into the event.

The ordering process also allows authorization for receiving orders prior to service delivery. Two types of authorization may be provided for: 1) authorization based on credit limitation, or 2) authorization based on parental control. Accurate records, correlated by program, are kept by the converter 14 until transferred to system 10 for analysis. Records include data on customer identification, events ordered and canceled (program title, start date and time), time and day of order transaction, blockage in ordering or receiving service, and price of program.

The present invention contemplates alternate embodiments for methods of ordering programming. In a first preferred embodiment, a subscriber accesses a keypad or remote control (not shown) for the subscriber's converter 14 to enter an order. A simple push of a button may successfully cause an order to be entered. The converter 14 records the fact that an order has been placed in a memory 48, and associates the time of day and the channel being viewed with this information. Converter 14 may also verify that credit limits and parental authorization permit the order. This order will enable converter 14 to unscramble the programming in response to a global unscramble signal received from system 10.

Preferably, downstream controller 24 of system 10 polls each set-top converter 14 daily. If converters 14 have collected billing data, controller 24 requests them to transfer this data to an upstream controller 25 of system 10. Such billing data may be transmitted either through the public switched telephone network (PSTN) 50 or over transmission system 13.

Alternatively, a subscriber may access a telephone 49, and place a telephone call to a predetermined number for system 10. Ordering and authorization data is thus placed through the PSTN 50 to system 10. This PSTN-directed data may be received at system 10 either by a customer service representative who operates a telephone 52 and transfers data to master scheduler 20, or by a substantially automated upstream controller 25. Controller 25 may include an automatic number indicator (ANI) 54 that automatically receives the telephone number of the calling party. Of course, PSTN 50 must automatically pass the telephone number, as is currently done in certain locations, to ANI 54 so that ANI 54 may receive it. This telephone number is used to identify the subscriber who is placing an order or transmitting authorization data. Automatic number identification is a conventional technology which is known to those skilled in the art of telephony.

A controller portion 56 of upstream controller 25 may control a conventional voice synthesizer 58 to return voice prompts back to the subscriber. Preferably, these voice prompts instruct the subscriber to press various keys on the subscriber's telephone. For example, the voice prompts may request the subscriber to first enter a personal identification number (PIN) for security purposes. The voice prompts may request the subscriber to enter a channel number for the program that a subscriber wishes to view. A conventional audio response unit (ARU) 60 couples to the phone line to detect dual tone multifrequency (DTMF) signals generated when the subscriber presses keys on the subscriber telephone 49 and reports the numbers to controller 56 for transmission to master scheduler 20.

When upstream controller 25 receives the billing data, it stores and formats the data for transfer to master scheduler 20. Scheduler 20 then passes the information on to billing computer 26. Billing computer 26 receives information for each transaction on the customer, the event code ordered, and any other necessary data to identify the event code with title, rating, channel, starting times as well as date, run time, and price. Billing computer 26 processes this data and prints a bill 27 which includes the program title, date, time, and price.

The system is adapted for transferring television programs from video server 11, i.e. upstream transmitter, over the transmission system 13 to a downstream video recorder 28 and television receiver 29 coupled to the converter 14. The downstream control signals may be sent on cable, fiber, or telephone lines, but preferably the same media the television signals are sent on. Control data which relate to establishing authorization levels, ordering programming, and canceling programming are transmitted from individual subscriber premises 36 via an upstream data link, through upstream controller 25, to master scheduler 20 and billing computer 26. This upstream data link may be provided by the PSTN 50 or by transmission system 13.

Figure 3:
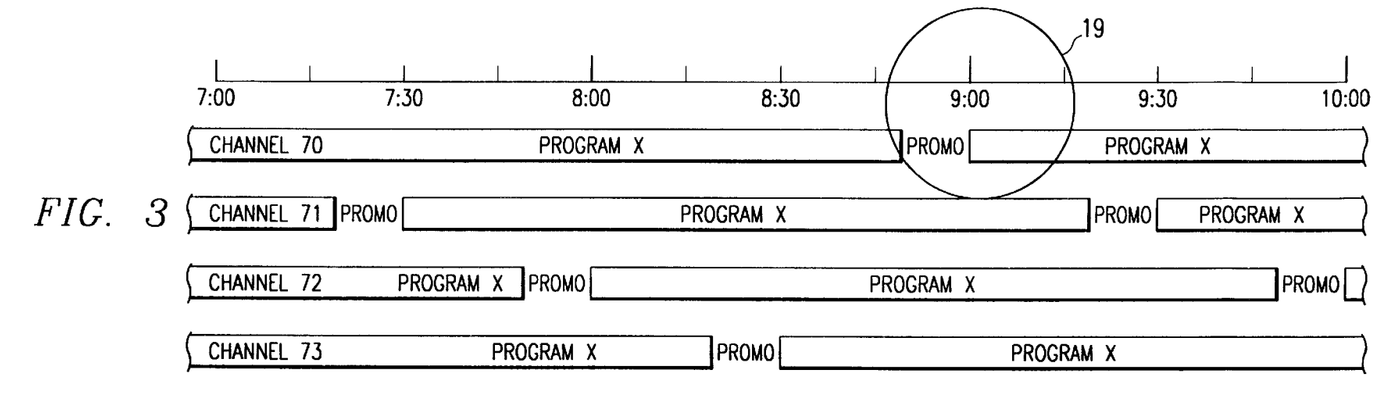
FIG. 3 shows an exemplary schedule or exhibition plan followed in exhibiting performances on four different channels throughout a three hour period.
Figure 4A:
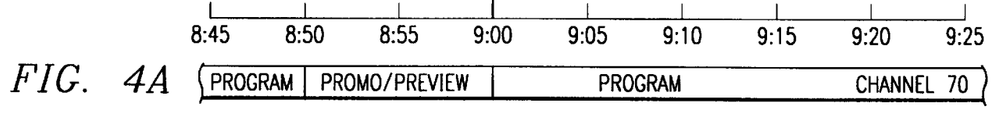
FIG. 4 shows a detailed timing diagram of a preferred system operation that occurs around the time when one exhibition of a pay-per-view program ceases and another pay-per-view exhibition begins.
Figure 4B:
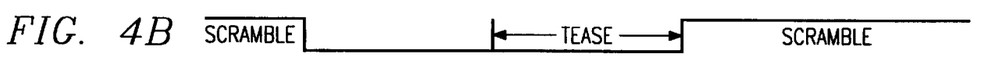
Figure 4C:
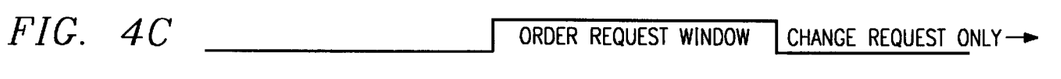
Figure 4D:
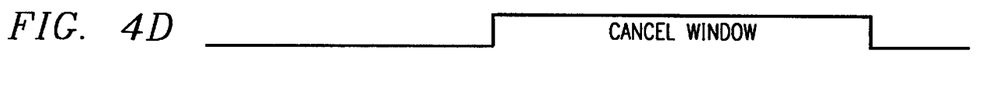

System 10 is operated substantially as illustrated in FIGS. 3–4 to provide video programming to subscribers nearly on demand. FIG. 3 shows an exemplary schedule or exhibition plan followed in exhibiting performances on four different programming channels (see FIG. 2) throughout a three hour period. Thus, FIG. 3 illustrates the operation of four of program video players 17 (see FIG. 2). Each channel, labeled channels 70–73 in FIG. 3, exhibits a combination of premium programming and promotional programming, as discussed above. The premium programming represents programming which subscribers must pay for and unscramble in order to render the programming intelligible. In other words, the premium programming represents pay-per-view (PPV) programming.

In order to provide near video on demand (NVOD) services, a single program or performance, labeled as program X in FIG. 3, is exhibited simultaneously on each of channels 70–73. While each exhibition is simultaneously broadcast on transmission system 13, the exhibitions are offset or staggered in time relative to one another. In the example depicted in FIG. 3, program X has a run length of around 110 minutes and a repeat factor of 120 minutes. Thus, on each of channels 70–73, program X is exhibited for 110 minutes. When program X finishes, promotional programming is exhibited for 10 minutes. While the promotional programming is being exhibited, tapes 30 (see FIG. 2) upon which program X is recorded are rewound and queued for a subsequent exhibition. After 10 minutes of promotional programming, program X is again exhibited, starting from its beginning. This process of repeating program X every 120 minutes continues indefinitely, until overall exhibition plans call for the exhibition of different programming.

In the example depicted in FIG. 3, exhibitions of program X are staggered 30 minutes from one another on channels 70–73. Thus, a first exhibition of program X begins at 7:00 on channel 70, a second exhibition of program X begins at 7:30 on channel 71, a third exhibition of program X begins at 8:00 on channel 72, and a fourth exhibition of program X begins at 8:30 on channel 73. In the preferred embodiment, 30 minutes after the exhibition of program X begins on channel 73, an exhibition of program X begins again on channel 70, and so on. Thus, a subscriber may view program X at any time that the subscriber prefers to view program X, within a 0–30 minute interval. This offset interval is relatively short in relation to the overall run time of the program. Generally speaking, this interval is sufficiently short that subscribers may make impulse decisions concerning programming that they wish to view. While program X may not be instantly available from its beginning at the precise minute a subscriber wishes to view it (i.e. "on demand"), program X is nearly available when a subscriber wishes to view it (i.e. "nearly on demand").

While a 30 minute offset interval has been described above, those skilled in the art will recognize that exhibitions of program X could likewise be staggered at 15 minute intervals or at any other interval that the bandwidth of transmission system 13 permits. If system 10 employs a 15 minute offset or staggering interval, then a 120 minute repeat factor program, such as program X, requires eight channels to provide NVOD service within a 0–15 minute interval.

In the preferred embodiment of the present invention, 28 channels are dedicated to providing PPV services. Accordingly, scheduling may be configured as desired to provide either a few exhibitions at a very short offset interval or more exhibitions at a longer offset interval. The shorter the offset interval, the more "nearly" video programming becomes "on demand".

FIG. 4 shows a detailed timing diagram of a preferred operation for system 10 around the time when one exhibition of a PPV program ceases and another PPV exhibition begins. This interval generally occurs around the time that promotional programming is being exhibited, as shown at detail 19 in FIG. 3.

Trace A in FIG. 4 presents substantially the same information as is presented for channel 70 in FIG. 3. In particular, FIG. 4 shows that an exhibition of a PPV performance ends at 8:50, followed immediately by 10 minutes of promotional programming. At 9:00 exhibition of the PPV performance begins again. Those skilled in the art will recognize that operation of system 10 similar to that illustrated in FIG. 4 will take place for each of the channels that exhibit PPV programming, although the timing for such operation may be offset as discussed above.

As discussed above in connection with FIG. 1, the PPV exhibition is scrambled. The control of scrambling is depicted in trace B of FIG. 4. The scrambling is removed when the exhibition of the PPV program ends, which occurs at 8:50. The removal of scrambling at headend 12 (see FIG. 1) is accompanied with a global data communication instruction to all addressable converter boxes 14 (see FIG. 1) to cease unscrambling operations in connection with the subject channel, which is channel 70 in this example. Accordingly, after 8:50 all subscribers may view the promotional programming, which preferably shows a preview of upcoming PPV programs.

Even though the subsequent exhibition of PPV programming begins at 9:00, the PPV programming remains unscrambled for a predetermined interval, preferably around 10 minutes, after the beginning of the PPV programming. This interval is referred to as a tease interval. During the tease interval a subscriber may view the beginning of PPV programming even though the subscriber has not yet ordered the program. However, after the end of the tease interval, the PPV program is again scrambled. The scrambling of PPV programming at headend 12 is accompanied with a global data communication instruction to all subscriber's addressable converter boxes 14 to begin unscrambling operations in connection with the subject channel. However, as discussed above, only those addressable converter boxes 14 which have been enabled will engage in unscrambling operations with respect to the subject channel.

In order for an addressable converter box 14 to become enabled so that it will unscramble an incoming channel's programming, an order for PPV programming must be placed. Trace C of FIG. 4 shows a timing window within which orders for PPV programming are accepted. Preferably, this order request window begins when PPV exhibition begins, which occurs at 9:00 in this example. This window continues for a predetermined interval beyond the end of the above-discussed tease interval. Accordingly, scrambling is implemented to force subscribers to place orders if they wish to continue viewing PPV programming. When orders are placed, the respective addressable converter boxes 14 become enabled, and thereafter unscramble the incoming PPV programming.

As discussed above, the ordering process includes the ability for a subscriber to cancel a request order. As shown in trace D, a cancel window begins when the order request window begins and extends beyond the order request window. Thus, a subscriber is given a finite interval within which to cancel his or her order. In the preferred embodiment, this cancel window extends for around 5 minutes past the end of the order request window.

With reference back to FIG. 3, the methodology of the present invention contemplates the switching of subscriber viewing between channels to provide the subscriber with a pause in viewing. For example, a subscriber may order program X at a point in time that causes his or her addressable converter box 14 to enable channel 70. However, while viewing program X, the viewer may be called away from television receiver 29 (see FIG. 1) to answer a telephone, get snacks, or any other of a myriad of reasons. When this happens, the subscriber may simply re-order the programming. The subscriber's addressable converter box 14 will understand that it is currently in an enabled state and automatically revise enablement to a subsequent channel so that the subscriber may view the subsequent exhibition of program X, which in this case is channel 71. The subscriber will be permitted to make this switch a predetermined number of times, and billing computer 26 will process the multiple orders so that the subscriber does not pay for multiple entire viewings of PPV programming.

In summary, the present invention provides a method for providing improved pay-per-view programming to subscribers of a network. The present invention provides a method for delivering programs to subscribers nearly in an on demand or impulse basis. In addition, the present invention provides a method for controlling the scrambling and unscrambling of programming so that subscribers can view intelligible preview and promotional programming but not view substantial portions of PPV programming in an intelligible fashion until paying for it.

The present invention has been described above with reference to a preferred embodiment. However, those skilled in the art will recognize that changes and modifications may be made in this preferred embodiment without departing from the scope of the present invention. For example, the specific timing and channel numbers presented in FIGS. 3 and 4 are illustrative of an example of possible scheduling. Those skilled in the art will recognize that precise scheduling will depend on the performances being exhibited. These and other changes and modifications which are obvious to those skilled in the art are intended to be included within the scope of the present invention.

What is claimed is:

1. A video distribution system for providing video programs to subscribers via a transmission medium with capacity for a plurality of channels, the video distribution system comprising:

(a) a controllable video server for storing video programs and for simultaneously applying a selected video program to at least two of the channels; and (b) a scheduler coupled to the video server and operable to control the video server according to a predetermined schedule so that the selected video program has a starting time on one of the channels that is staggered from the starting time on another of the channels by a time interval of relatively short period in relation to the run-time of the selected video program.

2. A video distribution system as defined in claim 1, further comprising means for processing requests from subscribers to view the selected video program at a starting time established in accordance with the predetermined schedule.

3. A video distribution system as defined in claim 1, further comprising means for processing video programs in a manner that renders those programs substantially unintelligible before broadcasting the programs to subscribers.

4. A video distribution system as defined in claim 2, further comprising means for processing video programs in a manner that renders those programs substantially unintelligible before broadcasting the programs to subscribers.

5. A video distribution system comprising:

video server means for storing video programs and for applying selected video programs to a transmission medium;

means associated with the video server means for controlling the video server means according to a predetermined schedule so that at least one selected video program is applied, in accordance with the predetermined schedule, simultaneously to at least two of channels of the transmission medium, with the respective starting times of the selected video program on each channel being staggered by a time interval of relatively short period in relation to the run-time of the selected video program; and means for processing requests from subscribers to view the selected video programs at a starting time that is established in accordance with the predetermined schedule.

6. A video distribution system as defined in claim 5, further comprising means for processing the video program in a manner that renders the program substantially unintelligible.

7. A video distribution system as defined in claim 6, further comprising means for rendering the unintelligible program intelligible.

8. A video distribution system as defined in claim 5 wherein the means for controlling the video server is integral to the video server.

9. A video distribution system as defined in claim 8, further comprising means for processing the video program in a manner that renders the program substantially unintelligible.

10. A video distribution system as defined in claim 9, further comprising means for rendering the unintelligible program intelligible.

11. A video server comprising:
    (a) means for storing a video program;
    (b) means for providing the video program at two separate outputs; and
    (c) means for causing the video program to be provided simultaneously at the two separate outputs, the means effecting a predetermined schedule whereby the video program is provided at the two outputs at starting times that are staggered by a time interval of relatively short period in relation to the video program run-time.

12. A video distribution system having an input coupled to a network for transmitting requests from subscribers and an output coupled to a transmission medium comprising multiple channels for delivering video programs to subscribers, the video distribution system comprising:
    a video server for storing video programs;
    a headend coupled to the video server and to the transmission medium;
    a scheduler coupled to the video server and operable to control the video server according to a predetermined schedule so that at least one selected video program is applied, in accordance with the predetermined schedule, simultaneously to the transmission medium, with the respective starting times of the selected video program on at least two of the channels being staggered by a time interval of relatively short period in relation to the run-time of the selected video program.

13. A video distribution system as defined in claim 12, further comprising:
    first means coupled to the network for receiving requests from subscribers; and
    second means coupled to the first means for processing requests from subscribers.

14. A video distribution system as defined in claim 13, further comprising third means coupled to the second means for controlling the transmission of programs to subscribers.

15. A video distribution system as defined in claim 14, wherein the third means causes video programs to be scrambled in response to information received from the scheduler.

16. A video distribution system as defined in claim 15, wherein the third means selectively causes programs to be unscrambled for viewing by requesting subscribers.

17. A video server for a near-video-on-demand video distribution system, the video server comprising:
    program player means for playing recorded programs, the program player means including a plurality of outputs; and
    a processor means coupled to the program player means for controlling the operation of the program player means, the processor means operable in accordance with a predetermined schedule to control the program player means in a manner that causes a program to appear simultaneously at two outputs, with the respective starting times of the program at the respective outputs staggered by a time interval that is relatively short in relation to the run-time of the program.

18. A video server as defined in claim 17, further comprising promotional player means coupled to the processor means for substantially continuously playing promotional segments.

19. A video server as defined in claim 17, further comprising a character generator means coupled to the processor means for providing a menu representing a programming schedule.

20. A video server as defined in claim 18, further comprising a character generator means coupled to the processor means for providing a menu representing a programming schedule.

* * * * *